United States Patent
Dalton

[11] 3,950,794
[45] Apr. 20, 1976

[54] CAMP TOILET

[76] Inventor: Gerald J. Dalton, 459 N. 250 East, Kaysville, Utah 84037

[22] Filed: Oct. 25, 1974

[21] Appl. No.: 517,817

[52] U.S. Cl. .................................. 4/110; 4/116; 4/134; 4/138; 4/144
[51] Int. Cl.² ................. E03D 13/00; A47K 11/02
[58] Field of Search ............... 4/134, 142, 141, 138, 4/110, 111, 116

[56] References Cited
UNITED STATES PATENTS

| | | | |
|---|---|---|---|
| 2,053,586 | 9/1936 | Tohrner | 4/142 |
| 2,801,426 | 8/1957 | La Gorce et al. | 4/142 |
| 3,063,061 | 11/1962 | Bertram | 4/134 |
| 3,122,397 | 2/1964 | Mintz | 4/142 |
| 3,203,007 | 8/1965 | Olson | 4/116 |
| 3,235,884 | 2/1966 | Rehsteiner | 4/134 |
| 3,473,779 | 10/1969 | Gustafson et al. | 4/142 X |
| 3,495,278 | 2/1970 | Peters | 4/142 |
| 3,602,924 | 9/1971 | Kneisley | 4/142 |
| 3,737,920 | 6/1973 | Savee | 4/142 |

*Primary Examiner*—Henry K. Artis
*Attorney, Agent, or Firm*—B. Deon Criddle

[57] ABSTRACT

A lightweight, collapsible camp toilet having a supporting frame, a toilet seat carried by said supporting frame, and a bag-type receptacle suspended beneath the toilet seat. Linkage means are provided to automatically open the bag when weight is applied to the seat, and to allow the bag to close when the weight is removed from the toilet seat.

7 Claims, 6 Drawing Figures

CAMP TOILET

BRIEF DESCRIPTION OF THE INVENTION

1. Field of the Invention

This invention relates to camp toilets, i.e., lightweight toilets that can be easily transported for use in even remote areas.

2. Prior Art

In the past, a great many camp toilets have been proposed. Some of the known camp toilets include a receiving chamber located beneath the toilet seat to receive human waste material, a water storage reservoir and a holding tank. In toilets of this type, some means is generally provided to flush the water through the receiving chamber and into the holding tank. While this type of camp toilet has proven suitable for use in camper vehicles, boats, and for many long term or established camping situations, it is not entirely satisfactory for all purposes. Because of the size and weight of the camp toilets having receiving chambers, water reservoirs and holding tanks, they are not conveniently used in back-packing operations and are not conveniently used in many other situations such as short term camps. There is also a folding camp toilet that has a support frame, a toilet seat carried by the support frame, and a bag-type receptacle suspended beneath the toilet seat available commercially. This type of camp toilet is frequently preferred because it is lightweight and because it can be compactly folded for transport and storage. So far as I am aware, however, there has not heretofore been developed a camp toilet of the type having a support frame, a toilet seat carried by the support frame, and a bag-type receptacle suspended beneath the toilet seat wherein the bag can be conveniently closed when not in use. More particularly, I am not aware of such a toilet wherein the bag-type receptacle will automatically open for use when weight is applied to the toilet seat, and that will automatically close when the weight is removed. Such opening and closing is highly desirable from both an aesthetic and a sanitation standpoint.

SUMMARY OF THE INVENTION

It is a principal feature of the present invention to provide a camp toilet that is lightweight, capable of being compactly folded, that has a bag-type receptacle that will automatically open for use and that will thereafter automatically close.

Other objects are to provide a camp toilet of the type described that does not cost significantly more than other available camp toilets and one in which the bag-type receptacle is easily positioned beneath the toilet seat and is easily removed from beneath the toilet seat.

Principal features of the present invention include a support frame including pivotally interconnected legs, a toilet seat supported on the frame such that relative movement between the toilet seat and frame members is permitted, a pivotally mounted bag support for carrying one side of the bag-type receptacle and means for clamping the other side of the bag in fixed position relative to the frame, means for normally holding the pivotally connected legs a set distance apart and for biasing them back to the set distance after they have been moved further apart, and linkage means interconnecting the legs and the bag supporting member such that movement of the legs is transmitted into opening and closing movement of the bag supporting member.

Additional objects and features of the invention will become apparent from the following detailed description and drawings, disclosing what is presently contemplated as being the best mode of the invention.

THE DRAWINGS

In the drawings:

FIG. 1 is a perspective view of the camp toilet of the invention, without a bag-type receptacle;

FIG. 2, a vertical section view taken on the line 2—2 of FIG. 1;

FIG. 3, an enlarged, fragmentary, sectional view, taken within the line 3—3 of FIG. 2, and showing a bag-type receptacle in phantom lines, clamped in place;

FIG. 4 is a front elevation view of the camp toilet, with a bag-type receptacle mounted thereon;

FIG. 5, a vertical section view taken on the line 5—5 of FIG. 4 and with the bag-type receptacle shown in its closed position; and FIG. 6, a view like that of FIG. 5, but showing the bag-type receptacle in its open position.

DETAILED DESCRIPTION

Figure 1:
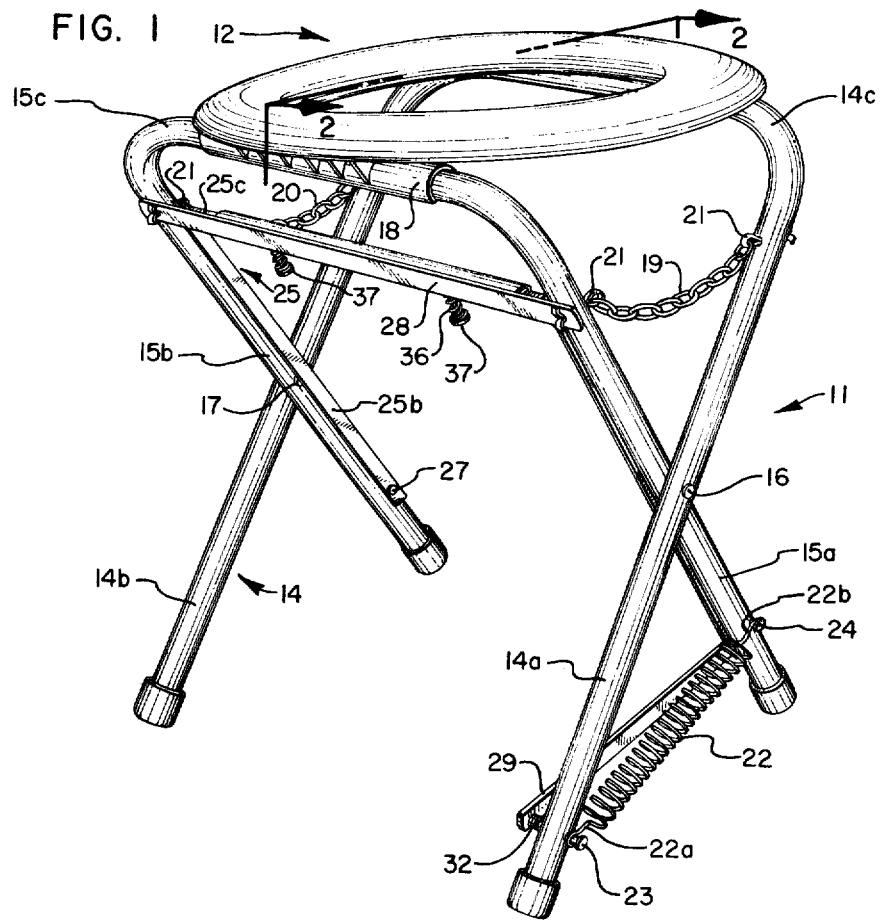
Figure 2:
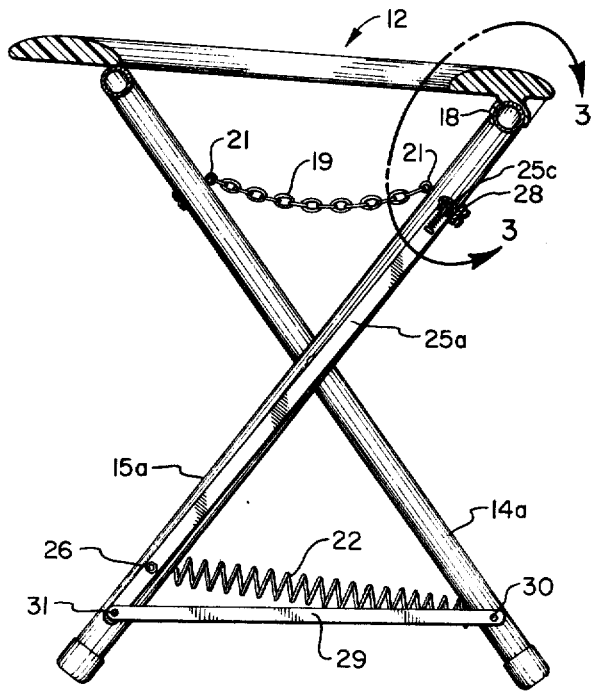

Referring now to the drawings:

In the illustrated preferred embodiment, the camp toilet of the invention, shown generally at 10, includes a support frame 11, a toilet seat 12, and a bag-type receptacle 13 which is shown best in FIGS. 3–6.

The support frame 11 comprises an outer U-shaped frame member 14 having leg portions 14a and 14b interconnected by a web portion 14c. An inner U-shaped frame member 15 includes legs 15a and 15b that are interconnected by a web 15c. The legs 14a and 15a of the members 14 and 15 are pivotally interconnected intermediate their lengths by a pin 16 and the legs 14b and 15b are similarly pivotally interconnected intermediate their lengths by a pin 17 such that the frame member 14 will pivot within the frame member 15.

Toilet seat 12 is of generally ring-shape, and may be made of any suitable material such as plastic, pressed wood, or even metal.

A generally C-shaped clamp 18 is formed on the bottom of toilet seat 12 at one end thereof. The clamp 18 is preferably elongate to extend along a substantial portion of the length of the web 15c. In addition, the clamp 18 is preferably resilient to expand over and to tightly grip the web 15c. The bottom surface of toilet seat 12 opposite to the end to which clamp 18 is attached rests on the web 14c. Chains 19 and 20, are secured at their ends to the heads of cotter pin 21 extending through the upper portion of the legs of members 14 and 15, such that the chains limit the pivotal movement of the members, whereby the web 14c cannot be pivoted from beneath the toilet seat 12.

A spring 22 has its ends 22a and 22b respectively connected to posts 23 and 24 that project from the legs 14a and 15a near the free end thereof. In its relaxed state, the spring 22 biases the legs 14a and 15a to a bag closing position, as will be hereinafter further defined.

A generally U-shaped bag supporting frame 25 includes legs 25a and 25b that are interconnected by a web 25c. Leg 25a is pivotally connected intermediate its length to leg 15a by a pivot pin 26. Similarly, the leg 25b is pivotally connected to leg 15b by a pivot pin 27. A bar 28 extends between the legs 15a and 15b a spaced distance from the web 15c, and the web 25c is adapted to rest against the bar 28. As shown, the bar 28 may be secured to the legs 15a and 15b by cotter pins 21 to which the chains 19 are attached.

A link 29 has one end pivotally connected to the leg 14a, i.e., a pivot pin 30. The other end of the link 29 is pivotally connected at 31 to the free end of leg 25a. A spacer 32 surrounds the pivot pin 30 between the leg 14a and the link 29 to provide for straight alignment of the link.

Figure 3:
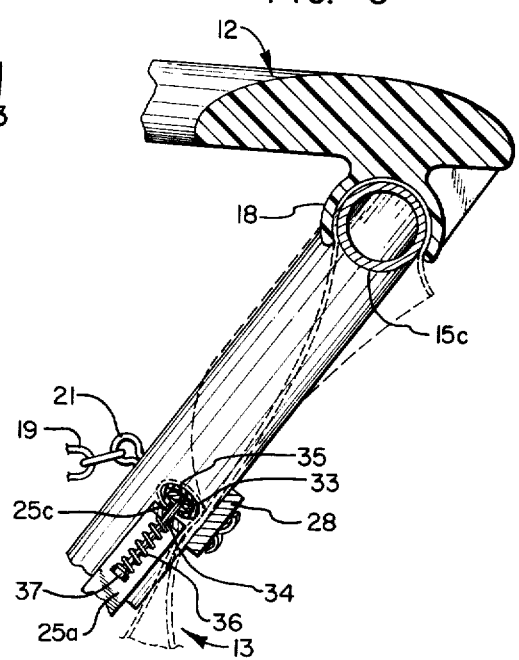
Figure 4:
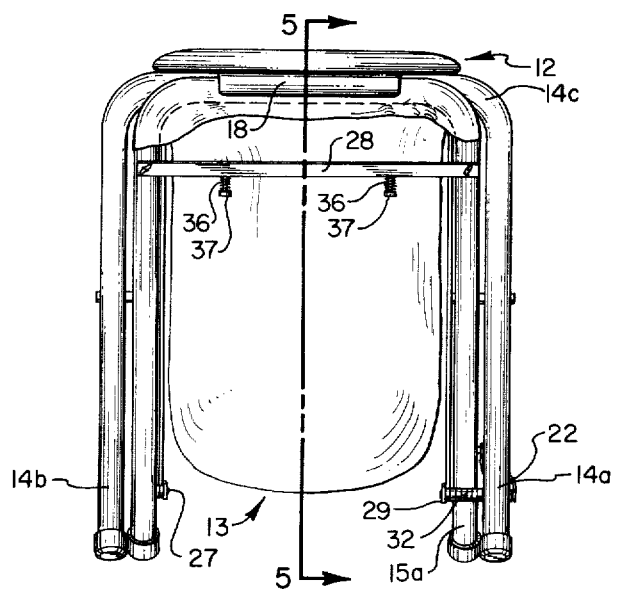
Figure 5:
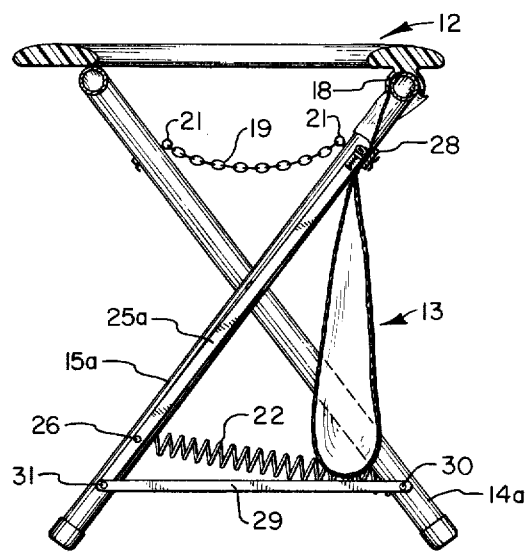
Figure 6:
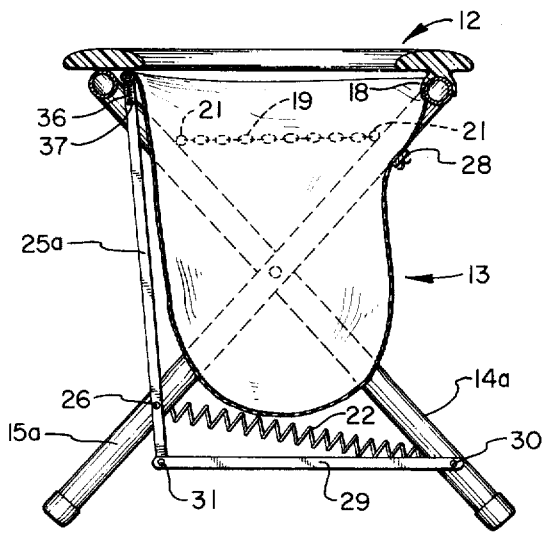

A clamping bar 33, shown best in FIG. 3, extends parallel to the web 25c and has spaced apart posts 34 extending through holes provided therefore in the web 25c. A rubber tubing 35 surrounds the holding bar 33 to provide a secure gripping means for a bag, as will be hereinafter further described. A spring 36 is telescoped on each post 34 and is positioned between the web 25c and a head 37 on the post 34. The springs 36 thus serve to bias the tubing covered holding bar against the web member 25c. While other materials may be suitable, it is presently preferred that the tubing 35 be made of surgical rubber.

In using the toilet of the invention, the frame 11 is set up with the free ends of the legs of frame members 14 and 15 on the ground and the web portions 14c and 15c thereabove. A bag 40 is positioned beneath the seat 12 by clamping one side of the bag between the web 15c and the C-shaped clamp 18, and the other opposite side of the bag is clamped between the folding bar 33 and the web 25c. In clamping one side of the bag between the web 15c and the C-clamp 18, the seat 12 is merely removed from the support frame, the top edge of one side of the bag 40 is wrapped over the web 15c, and the seat 12 is repositioned with the C-clamp gripping the web 15c and with a portion of the edge of bag 40 positioned therebetween. To attach the opposite side of bag 40 to the bag supporting frame 25, it is only necessary for a user to grasp the tube covered holding bar 33 and to pull it away from web 25c against the bias of springs 36. While the holding bar 33 is thus held away from the web 25c the upper edge of the opposite side of bag 40 is wrapped over the holding bar and the edge is turned beneath the holding bar so that when the holding bar is released to spring against the web 25c the bag edge will be securely held.

Any weight applied downwardly on seat 12 that is sufficient to overcome the bias of spring 22 will force the portion of frame member 15 above the pivot pins 16 and 17 slightly downward. At the same time, the portion of frame member 14 above the pivot pins 16 and 17 will be forced slightly downward and will be pivoted away from the upper portion of frame member 15, to the extent permitted by the lengths of chains 19 and 20. Also at the same time, the free ends of the legs of frame member 14 will be pivoted to be further from the free ends of the legs of frame member 15. The spreading action on the free ends of the legs of frame members 14 and 15 will act through link 29 to rotate the bag supporting frame 25 about its pivot pins 26 and 27, thereby moving the holding bar 33 and the side of the bag attached thereto away from stop bar 28. This, of course, opens the bag 40 beneath the seat 12. When downward pressure is removed from the seat 12, any weight in the bag 40, which is positioned off-center with respect to the pivot pins 26 and 27, will cause the bag supporting frame 25 to pivot about the pivot pins 26 and 27 until the bag supporting frame 25 is stopped by engagement with bar 28. This pivoting movement of bag supporting frame 25 tends to pull the free ends of the legs of frame member 14 towards the free ends of the legs of frame member 15. Spring 22 which is expanded upon application of a downward pressure to seat 12 also assists in moving the free ends of the legs of frame member 14 back towards the free ends of the legs of frame member 15, and at this same time assists in rotating the bag supporting frame 25 back into engagement with bar 28. Since the bag 40 hangs between the bar 28 and the holding bar 33, rotation of the holding bar of the bag supporting frame 25 into engagement with bar 28 will securely close the bag. It will be apparent that the greater the weight in bag 40 the greater the closing force.

The toilet 10 thus provides a unit that can readily use available, disposable bags, which may be plastic, paper or other suitable material and which may be biodegradable. The bag used is arranged such that when a user sits on the toilet seat, the bag will automatically open, but when weight is removed from the toilet seat, the bag will automatically close. This results in a toilet that reduces odors, does not attract flies, and in general is much more aesthetically pleasing than similar toilets heretofore known. The opening and closing occurs without requiring any special manipulation by a user and the bag is easily installed and can be removed without contact with bag contents.

Although a preferred embodiment of my invention has been herein described, it is to be understood that the present disclosure is made by way of example and that variations are possible without departing from the scope of the hereinafter claimed subject matter, which subject matter I regard as my invention.

I claim:

1. A camp toilet comprising
    a support frame;
    a ring shaped toilet seat carried by said support frame;
    means for releasably suspending a bag-type receptacle having an upper inlet end beneath the toilet seat;
    means for securing one side of the inlet end with respect to the ring and seat; and means for pivotally opening and closing the inlet end of the bag-type receptacle beneath the toilet seat including, means for supporting and swinging an opposite side of the inlet end toward said secured side to close the bag beneath the seat, and away from said secured side to open the bag beneath the seat.

2. A camp toilet as in claim 1, wherein
    the means for opening and closing the bag-type receptacle includes means responsive to pressure applied to the seat to open the bag-type receptacle and to removal of pressure from the seat to close the bag-type receptacle.

3. A camp toilet as in claim 1, wherein
    the support frame comprises
        an outer, generally U-shaped frame member having spaced apart legs interconnected by a web,
        an inner, generally U-shaped frame member having spaced apart legs interconnected by a web,
        means pivotally interconnecting the legs of the U-shaped frame members intermediate their lengths, whereby the inner U-shaped frame member will pivot within the outer U-shaped frame member; and wherein
    the means for releasably suspending a bag-type receptacle beneath the toilet seat comprises clamping means on the bottom of the toilet seat at one side thereof, said clamping means being adapted to secure the seat to the web of the inner frame member with an edge portion of a bag-type receptacle therebetween, and a generally U-shaped bag supporting frame having legs pivotally connected to the legs of the inner frame and interconnected by a web, a clamping bar resiliently secured to the web of the bag supporting frame whereby another edge of the bag can be turned between the web and the clamping bar and will be securely held therebetween; and means for pivoting the bag supporting frame with respect to the support frame whereby said bag is opened and closed beneath the seat.

4. A camp toilet as in claim 3, wherein the means for pivoting the bag supporting frame comprises a link pivotally connected at one end to the bag support frame beneath the pivot connection of the bag support frame and the inner frame and at the other end to a leg of the outer frame.

5. A camp toilet as in claim 4, further including a spring interconnecting the legs of the inner and outer frames.

6. A camp toilet as in claim 5, further including means to limit movement of the bag supporting frame beneath the inner frame.

7. A camp toilet as in claim 6, further including means above the pivot connections of the inner and outer frames to limit movement of the webs of said inner and outer frames apart.

* * * * *